United States Patent [19]

Ishibashi

[11] 4,309,586
[45] Jan. 5, 1982

[54] HIGH FREQUENCY INDUCTION HEATING CIRCUIT

[75] Inventor: Kazuhisa Ishibashi, Yokohama, Japan

[73] Assignee: Toyo Seikan Kaisha, Ltd., Tokyo, Japan

[21] Appl. No.: 76,858

[22] Filed: Sep. 19, 1979

[30] Foreign Application Priority Data

Sep. 27, 1978 [JP] Japan ................ 53-119655

[51] Int. Cl.³ ............................................. H05B 6/06
[52] U.S. Cl. ........................ 219/10.77; 219/10.53; 219/10.71
[58] Field of Search ........... 219/10.77, 10.75, 10.53, 219/10.71, 482, 497, 501; 323/9, 1, 8, 7, 265, 282, 285

[56] References Cited

U.S. PATENT DOCUMENTS

| | | | |
|---|---|---|---|
| 2,709,740 | 5/1955 | Baker | 219/10.77 |
| 2,818,483 | 12/1957 | Blume | 219/10.41 |
| 3,686,460 | 8/1972 | Lamparter et al. | 219/10.77 |
| 3,806,688 | 4/1974 | MacKenzie et al. | 219/10.77 X |
| 3,880,599 | 4/1975 | Keller | 219/10.77 X |
| 3,930,193 | 12/1975 | Kornrumpf et al. | 219/10.77 X |
| 4,085,300 | 4/1978 | MacKenzie et al. | 219/10.77 X |
| 4,162,379 | 7/1979 | Sebens et al. | 219/497 |

FOREIGN PATENT DOCUMENTS

47-41398 10/1972 Japan ................ 219/10.69 X

*Primary Examiner*—Gene Z. Rubinson
*Assistant Examiner*—Philip H. Leung
*Attorney, Agent, or Firm*—Pennie & Edmonds

[57] ABSTRACT

A high frequency induction heating circuit for heating a plurality of articles where the heating circuit has a semiconductor oscillation circuit which includes a series resonance circuit having a heating coil and a condensor. A detection circuit for detecting changes in impedance and frequency variations in the heating coil is included as well as a current control circuit which is responsive to the detection circuit. A varible control gain regulation apparatus is included in the current control circuit such that current supplied to the coil becomes a nonconstant current control depending on the number of articles to be heated.

2 Claims, 8 Drawing Figures

HIGH FREQUENCY INDUCTION HEATING CIRCUIT

FIELD OF THE INVENTION

The present invention relates to a high frequency induction heating circuit and in particular to a high frequency semiconductor induction heating circuit improved so that the power supplied to the heating coil is controlled by feedback.

BACKGROUND OF THE INVENTION

Induction heating apparatus using high frequency power of 10 kilohertz or more has been utilized in various fields and is particularly suitable for uniform heating of articles supplied continuously in large quantities to a heating zone of a heating coil. For example such apparatus has been used to heat the bottom surfaces of metal caps to cause resin sheets to adhere to the bottom surfaces. That is, when sealing a bottle by mounting a metal cap on the bottle mouth, a thermoplastic resin sheet or liner such as vinyl chloride, polyethylene or polypropylene is attached to the inner bottom surface of the cap and a bottle mouth is then sealed with the resin sheet forming a sealing material. In order to attach the resin sheet firmly to the inner bottom surface of the cap, an adhesive primer such as an epoxy is painted on the inner bottom surface of the cap and the resin sheet is then firmly attached with the primer in a hot melted state. Under ordinary circumstances, the adhesive primer will adhere the resin sheet firmly to the bottom surface of the cap when the bottom surface has been heated to about 100°-200° C., and it is in this heating process that high frequency induction heating apparatus is used. Bottle sealing caps so made include screw caps, crown caps and pilfer-proof caps, but in almost every case, regardless of cap type, the resin sheet is adhered to the inner bottom surface by means of primer in order that the sheet serves as the sealing material.

In order that a plurality of articles may be heated to a uniform temperature in an induction heating apparatus, it is necessary that a nearly uniform heating energy be applied to each article as it is supplied to the heating station of the apparatus and high frequency induction heating circuits that will satisfy this requirement have been previously sought after. However, prior heating circuits have been deficient in that the heating energy imparted to each article to be heated has varied depending on the number of objects supplied to the heating station. This is because the impedance and frequency of the heating coil circuits comprising current conductors of the prior circuits fluctuate markedly because of the mutual inductance with the articles to be heated. For example, in comparing a case when eighteen metal caps are supplied to a heating station to be heated simultaneously with the case when a single metal cap is supplied, there are marked variations in the load impedance and the frequency of the heating coils and the energy imparted to the articles under each of these cases fluctuates widely so that large fluctuations occur in heating temperature. In particular, in extreme cases when the quantity of metal caps being continuously supplied to the heating apparatus varies with time, as in metal cap production processes when the supply of caps to the heating station reaches zero, very wide differences in heating temperature occur because of variations of load impedance in the heating coil circuit and fluctuations in frequency.

The variations in the impedance and frequency properties of the heating coils differ depending on the type of article being heated, and in the case of non-magnetic articles such as aluminum, there is a tendency for the frequency to increase as the number of articles supplied to the heating coil increases. This is because the inductance component in the heating coil circuit decreases and the resistance component increases depending on the supply of the articles. When the heating coil circuit is generally under constant current control, an increase in the frequency will bring about an increase in the energy supplied to the articles to be heated, and as a result, when the number of objects supplied to the heating zone is decreased, insufficient heating will occur.

In the case of strongly magnetic articles such as caps made of tin plate or steel, there is a completely opposite tendency for the frequency and energy to decrease depending on the supply of articles to the heating coil. As a result when the number of articles comprising strongly magnetic materials is decreased in supply to the heating coil, the result will be one of overheating.

It is therefore an object of the present invention to provide for a high frequency induction heating apparatus having a circuit which will impart a nearly equal heating energy to each article to be heated even when the quantity of articles supplied to the apparatus fluctuates.

DISCLOSURE OF INVENTION

Broadly a high frequency induction heating circuit according to the invention includes a semiconductor oscillator circuit which has a series resonance circuit which in turn includes a heating coil and a condenser. A detection circuit is included for detecting impedance and frequency variations in the heating coil. In addition a current control circuit is included for controlling current supplied to the heating coil and which is responsive to the detector circuit. The current control circuit includes a control gain regulation apparatus whereby control gain of the current control circuit may be selected so that current supplied to the heating coil becomes a non-constant current control which may be varied by the gain regulation apparatus to vary the current supplied to the heating coil in accordance with the number of articles supplied to the coil for heating.

The induction heating circuit of the invention is also characterized in that, when the heated objects are of non-magnetic material such as aluminum, the control gain of the current control circuit is selected so that the current supplied to the heating coil has a feedback control action weaker than any constant current control, and the current supplied to the heating coil increases as the number of heated objects supplied to the heating zone decreases.

The induction heating circuit of the invention is further characterized in that, when the heated objects are of strongly magnetic material such as tin plate, the control gain of the current control circuit is selected so that the current supplied to the heating coil has a feedback control action stronger than any constant current control and the current supplied to the heating coil decreases as the number of heated objects supplied to the heating zone decreases.

BEST MODE FOR CARRYING OUT THE INVENTION

Figure 1:
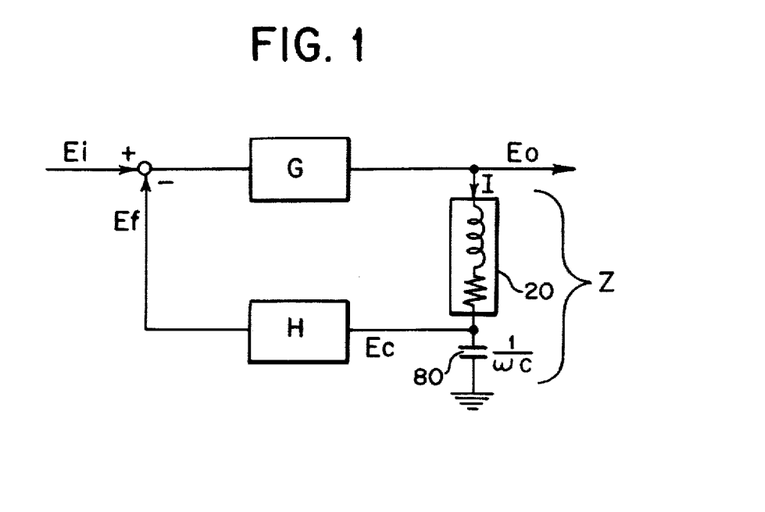
FIG. 1 is a block diagram of a circuit according to the invention utilized for heating objects made of a non-magnetic material.

Referring to FIG. 1, a block circuit diagram is illustrated which explains the principles of the apparatus relating to the present invention which imparts equal amounts of heat to articles such as bottle caps by controlling the current flowing in heat coil 20, and shows the case when the material of the caps is non-magnetic, such as aluminum.

Ei is the reference voltage and ordinarily a DC variable voltage is used.

Ef is a feedback voltage, and when a DC voltage is selected for Ei, Ef is ordinarily a DC voltage.

Eo is the output voltage of G and is a high frequency voltage proportional to the difference between Ei and Ef. It is represented by $$Eo = G(Ei - Ef) \quad (1)$$

Z is the impedance of the high frequency heating coil circuit (a series circuit of a heating coil and a condenser) and $1/\omega c$ is the impedance of condenser 80.

H rectifies terminal voltage Ec of condenser c and it obtains feedback voltage Ef. It has the relation $$Ef = HEc \quad (2)$$

When the feedback control such as shown in FIG. 1 is made, then Eo becomes $$Eo = \frac{G}{1 + \frac{HG}{\omega cZ}} Ei \quad (3)$$

Consequently, current I flowing in the heating coil is $$I = \frac{Eo}{Z} \quad (4)$$

-continued $$= \frac{G}{Z + \frac{HG}{\omega c}} Ei$$

The frequency of Eo is controlled so that it is nearly that of the heating coil circuit, that is, so that it is the resonance frequency of the series circuit of heating coil 20 and condenser 80. Ordinarily, when heating non-magnetic materials with the heating coil, the inductance component of the heating coil decreases and the resistance component increases. Consequently, the frequency of Eo increases as the number of caps n heated by the heating coil increases. This is approximated by $$\omega = \omega_o(1 + K_1 n) \quad (5)$$

and impedance Z of the heating coil circuit is approximated by $$Z = R_o(1 + K_2 n) \quad (6)$$

Here, $\omega_o$ and $R_o$ are respectively the angular frequency of Eo and the resistance of the heating coil when the caps are not being heated and $k_1$ and $k_2$ are constants.

Substituting Equations (5) and (6) in Equation (4), we get $$I = \frac{G}{R_o(1 + k_2 n) + \frac{HG}{\omega_o(1 + k_1 n)c}} Ei \quad (7)$$

Hence, since we get $$k_1 n \ll 1 \quad (8)$$

the denominator of Equation (7) is approximated by $$R_o(1 + k_2 n) + \frac{HG}{\omega_o(1 + k_1 n)c} = \quad (9)$$

$$R_o + \frac{HG}{\omega_o c} + \left(R_o k_2 - \frac{HGk_1}{\omega_o c}\right) n$$

When the frequency of Eo is fixed without regard to the number of caps n, if current I of the heating coil is kept fixed, equal amounts of heat will be imparted to the caps, but when the frequency varies, if current I of the heating coil is not controlled in response thereto, equal amounts of heat cannot be imparted to the caps.

Ordinarily, when the current flowing in the heating coils is constant, the higher the frequency the greater the amount of heat imparted to the heated objects. When the cap material is non-magnetic such as aluminum, since the frequency increases as the number of caps increases, it will be necessary to decrease the current of the heating coil in order to suppress an increase in the temperature rise of the caps because of the frequency increase component. Taking the proportion of this decrease as $k_3$, we get $$I = I_o(1 - k_3 n) \quad (10)$$

and in order to hold the temperature rise of each cap constant, we must establish $$\frac{R_o k_2 \frac{HG}{\omega_o C} \kappa_1}{R_o + \frac{HG}{\omega_o C}} = k_3 \quad (11)$$

and it will be understood that the value of HG can be determined from this equation to get $$\frac{HG}{\omega_o C R_o} = \frac{k_2 - k_3}{k_1 + k_3} \quad (12)$$

In this manner, when the feedback control characteristics are determined to satisfy Equation (12), it becomes possible to perform the heating action with a constantly uniform energy regardless of the number of heated objects being supplied.

Figure 2:
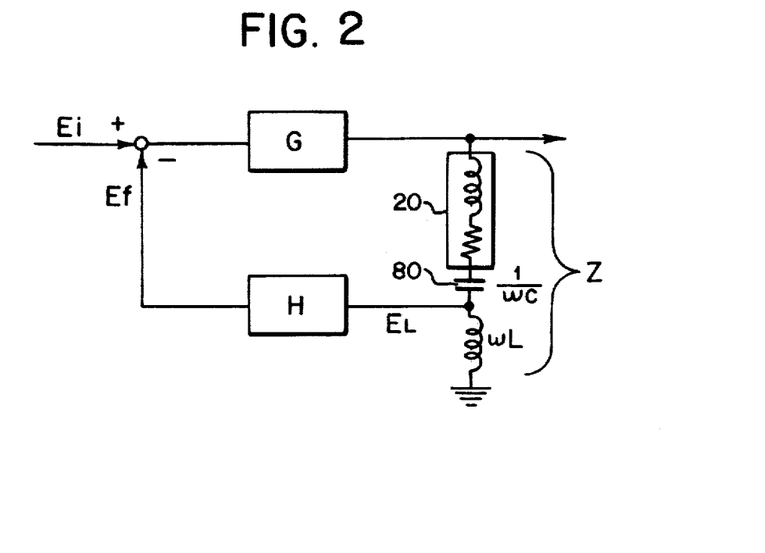
FIG. 2 is a block diagram of a circuit according to the invention utilized for heating objects made of a magnetic material.

Referring to FIG. 2, a block circuit diagram is illustrated which explains the principles of the apparatus that controls the current of heating coil 20 and imparts a uniform amount of heat to each article such as a bottle cap, when the caps are strongly magnetic, such as tin plate or tin-free steel.

In this case, since feedback circuit Ef is proportional to the terminal voltage of inductance L, current I of the heating coil becomes $$I = \frac{G}{Z + wLHG} E_i \quad (13)$$

Ordinarily when heating strongly magnetic material, the inductance component and the resistance component of the heating coil increase. Consequently, the frequency of Eo is approximated by $$\omega = \omega_o (1 - k_1' n) \quad (14)$$

and the impedance of the heating coil circuit is approximated by $$Z = R_o (1 + K_2' n) \quad (15)$$

When Equations (14) and (15) are substituted in Equation (13), we get $$I = \frac{G}{R_o + \omega_o LHG + (R_o k_2' - \omega_o LHG k_1') n} E_i \quad (16)$$

When the material of the caps is strongly magnetic, the frequency decreases as the number of caps increases, so that in order to suppress a temperature drop in the caps caused by the frequency decrease component, it is necessary to increase the current in the heating coil, and taking the proportion of this increase as $k_3'$, if we take it that $$I = I_o (1 + k_3' n) \quad (17)$$

then in order to make the temperature rise of each cap constant it will be necessary to establish that $$\frac{\omega_o LHG k_1' - R_o k_2'}{R_o + \omega_o LHG} = k_3' \quad (18)$$

and from this equation we get $$\frac{\omega_o LHG}{R_o} = \frac{k_2' + k_3'}{K_1' - k_3'} \quad (19)$$

it being understood that we can determine the value of HG. Although the principles of the present invention will be apparent from the explanation above, they will be further explained next in terms of specific high frequency induction heating apparatus.

Figure 3:
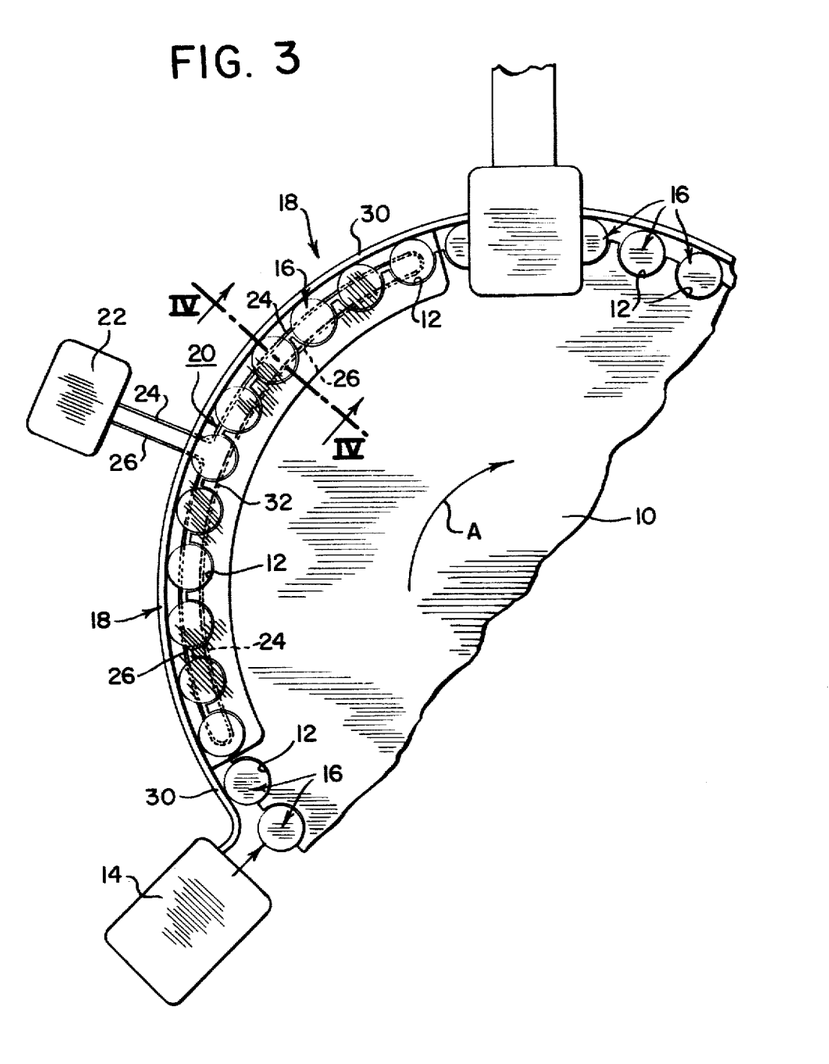
FIG. 3 is a broken plan view of a heating apparatus for heating metal bottle caps utilizing a high frequency induction heating circuit constructed according to the invention.

FIG. 3 is an example of a high frequency induction heating apparatus including the heating circuit relating to the present invention wherein caps that are the objects of the heating are heated continuously. A plurality of semicircular notches 12 are positioned at equal intervals on the periphery of a rotating table 10 which is rotated by a drive apparatus not illustrated. Each notch 12 is supplied successively with a cap 16 from a chute 14. Caps 16 are arranged in chute 14 with their bottoms facing downwards, and are inserted individually into each notch 12. The caps 16 are then moved in the direction of the arrow A by rotation of table 10. The caps are heated to a desired temperature, for example 100°-200° C., by high frequency induction heating at heating station 18, and are then delivered to a succeeding packing material supply station.

Heating station 18 is furnished with two windings of a heating coil 20 and a high frequency current from high frequency power source 22, including a semiconductor oscillator comprising a transistor oscillator is supplied to heating coil 20. The construction of heating station 18 is shown in greater detail and in sectional view in FIG. 4.

Figure 4:
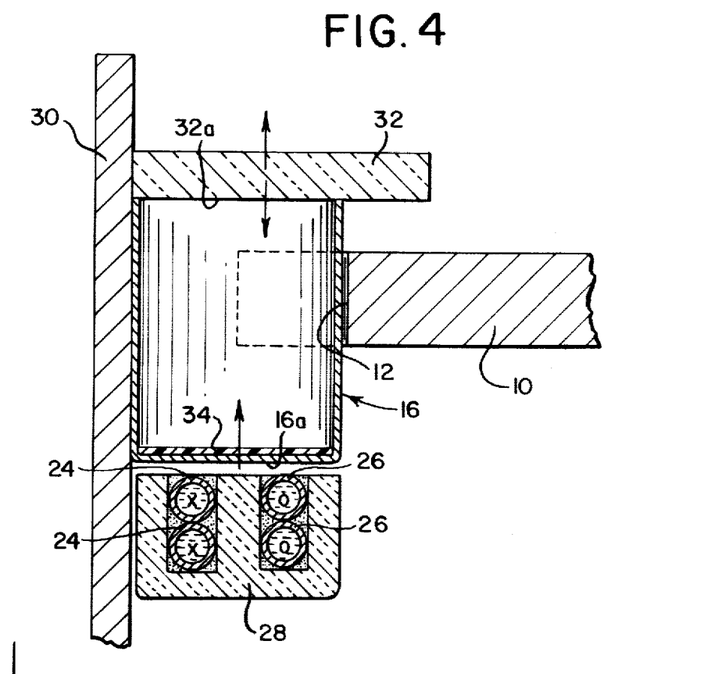
FIG. 4 is an enlarged sectional view taken along lines IV—IV of FIG. 3 illustrating construction of a heating station and guide means for guiding movement of caps through the station.

As shown in FIG. 4, current conductors 24 and 26 forming the high frequency induction heating coil are imbedded in an arc shaped coil base plate 28 comprised of a magnetic material such as ferrite and attached underneath the peripheral surface of the rotatable table 10. Consequently, each cap 16 that is transported by table 10 is induction heated by heating station 18, and at the time of this heating action, each cap 16 is guided in the transport route by guide wall 30 attached near the periphery of the table 10 and by guide plate 32 attached at the upper surface near the periphery of table 10.

Metal caps used previously ordinarily comprised strong mangetic materials such as tin plate or tin free steel, but in recent years, non-magnetic material such as aluminum, aluminum alloy, copper and brass have come into widespread use. Also caps made of weak magnetic materials such as low carbon steel plate have come into use. With the introduction of non-magnetic or weak magnetic caps, it has been found that because of the force of repulsion formed by the high frequency heating coil magnetic field and the induction current induced on and near the bottoms of the caps, the caps tend to flot over and jump on the transporting means such as conveyors, making it impossible in practice to sufficiently heat the caps.

In the example illustrated in FIG. 4, it will be apparent that since guide plate 32 is furnished above caps 16, the open surfaces of the caps 16 will contact the facing surface 32a of guide plate 32, and that caps 16 will be transported by rotating table 10 while sliding along facing surface 32a. Consequently, bottoms 16a of caps 16 will always move at a predetermined prescribed interval from current conductors 24 and 26 and the bottoms 16a of caps 16 will be induction heated uniformly and at a good efficiency. As a result adhesive primer 34 adhered to the bottom 16a will be heated to a temperature suitable for excellent adhesive action. Guide plate 32 can be adjusted as desired to a fixed position upwards or downwards, such that the interval between the heating station 18 and the facing surface 32a can be adjusted to accommodate caps having different heights making it possible to maintain bottoms 16a of caps 16 at the most suitable position for heating. Since the floating and jumping caps collide with guide plate 32, it is necessary that there be no deformation or damage from the force of such impact. Further, facing surface 32a must also satisfy the requirements that it have a smooth surface so that the open surface of caps 16 will slide and that there be little likelihood of friction damage caused by the sliding of caps 16. In the example illustrated, tempered glass plate having a thickness of 5-10 millimeters is used as guide plate 32 and this tempered glass plate has the further advantage of allowing observations of the state of transport of caps 16 while passing through the heating station.

Figure 5:
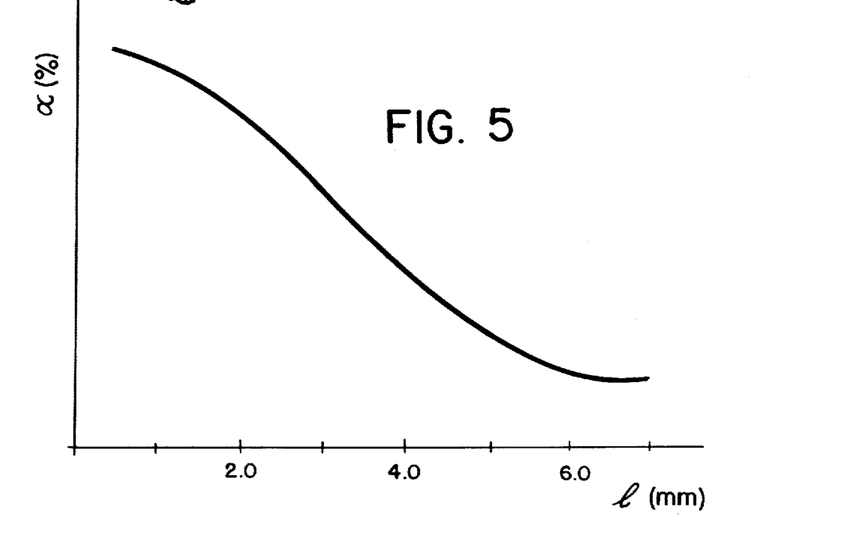
FIG. 5 is a graph illustrating temperature characteristics of a cap bottom relative to the distance between the bottom surface of the metal cap and the two ends of a heating coil current conductor.

In order that objects made of non-magnetic materials may be effectively heated, the interval between the current conductors and the objects should be as small as possible. FIG. 5 shows the characteristics of temperature rise rate α of cap bottom 16a against interval $l$ between cap bottom 16a and the upper end of conductors 24 and 26. As will be apparent from this graph, it is necessary that the distance $l$ between the cap bottom 16a and the conductors 24 and 26 be less than 4 millimeters, and preferably less than 3 millimeters.

On the other hand, in the case of objects comprising strong magnetic materials, the coupling between the heating coil and the objects will be strong making it unnecessary to have a small interval between the two, and in order to get the same effective matching as with non-magnetic materials, the interval between the two can be set comparatively wider, preferably at 4-6 millimeters.

Figure 6:
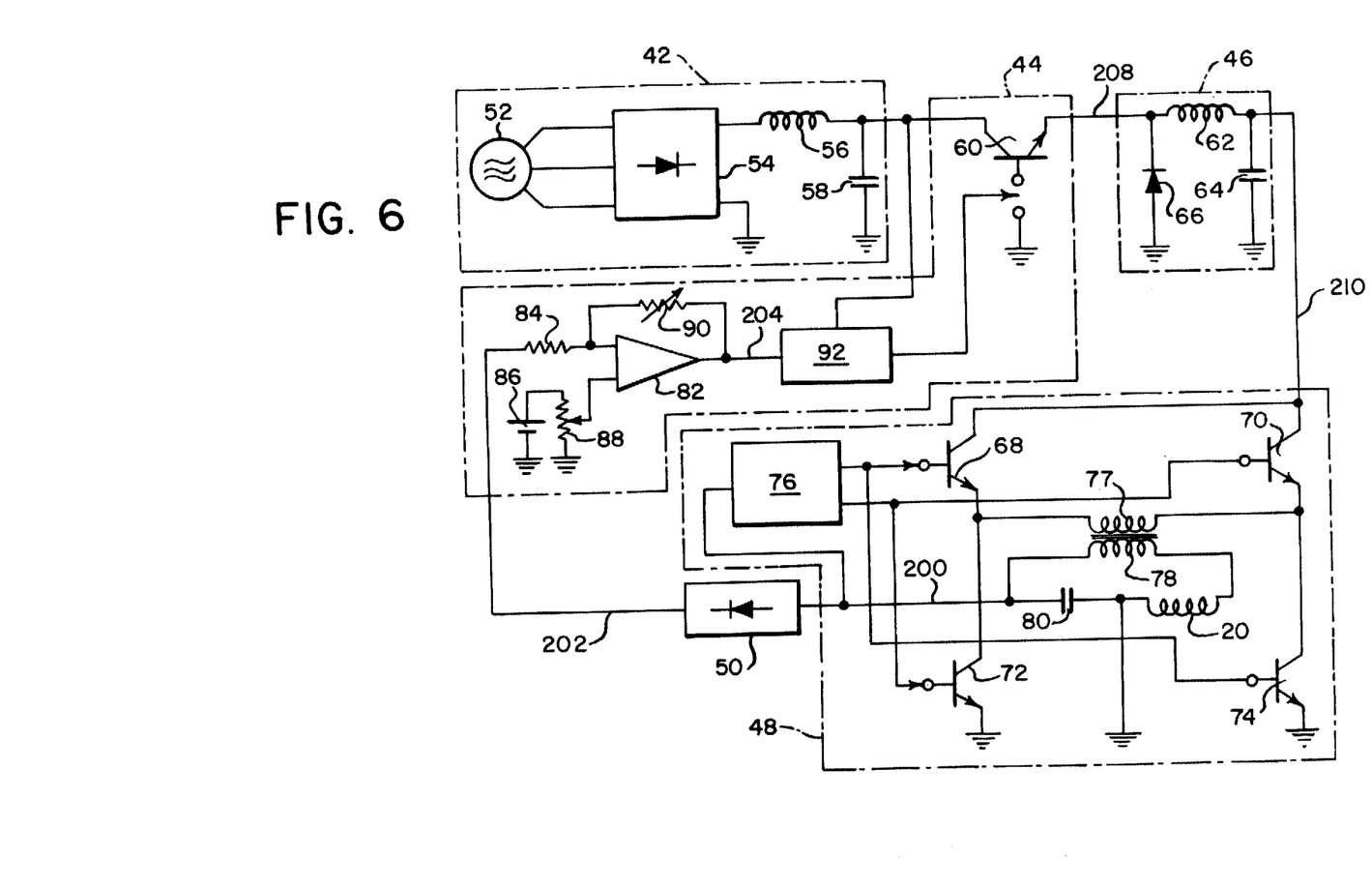
FIG. 6 is a circuit diagram illustrating a high frequency induction heating current constructed according to the invention.

FIG. 6 illustrates an example of a high frequency induction heating circuit constructed according to the invention that contains a heating coil 20 located at a heating station of a heating apparatus. The output of a power source apparatus 42 has its current supply to heating coil 20 controlled by a current control circuit 44, and this output is supplied to a semiconductor oscillator circuit comprising a transistor oscillator circuit 48 via a smoothing circuit 46. The current supply to heating coil 20 of transistor oscillator circuit 48 is detected by detection circuit 50 and this detection signal is supplied to the current control circuit 44.

Power source apparatus 42 includes a three-phase AC power source 52, and after its three-phase output has been rectified by rectifier 54, the ripple is removed by smoothing coil 56 and condenser 58 and is then supplied to the collector of control transistor 60 of the current control circuit 44. Control transistor 60 pulse width controls the DC smoothing output from power source apparatus 42 and the output is supplied from the emitter to smoothing circuit 46.

Power source apparatus 42 includes a constant voltage circuit and the constant voltage output is supplied to smoothing circuit 46 although in the present invention it is also possible to furnish a constant voltage circuit forward of powr source apparatus 42.

Smoothing circuit 46 includes a smoothing coil 62, a condenser 64 and a flywheel diode 66. The circuit 46 rectifies the pulse width controlled pulse wave form and supplies the respective collectors of transistors 68 and 70 in oscillator circuit 48. Transistors 68 and 70 also form an oscillation switching transistor group together with other transistors 72 and 74 and the transistor pair 68 and 74 and the transistor pair 70 and 72 are respectively on-off controlled by a control signal from a switching control circuit 76. An output transformer primary coil 77 is connected on one side between the emitter of transistor 68 and the collector of transistor 72 and on another side between the emitter of transistor 70 and the collector of transistor 74. A series resonance circuit including heating coil 20 and condenser 80 is connected to output transformer secondary coil 78. The terminal voltage of condensor 80 is supplied to switching control circuit 76 and the resonance frequency of the series resonance circuit is supplied from the terminal voltage variation of condenser 80 to switching control circuit 76. The oscillation frequency of transistor oscillator circuit 48 and the switching actions of the several transistors 68, 70, 72 and 74 are determined by the resonance frequency.

The terminal voltage of condenser 80 is also supplied to a detector circuit 50 such that the output current of the heating coil 20 is detected by detection circuit 50. Detection circuit 50 has a rectifier and converts the output voltage of condenser 80, comprising an AC signal, to DC voltage.

The detection signal of detection signal 50 is supplied to the current control circuit 44 so that the supply current supplied from power source apparatus 42 to oscillator circuit 48 via smoothing circuit 46 is controlled as explained below with reference to the waveform diagram of FIG. 7.

Figure 7:
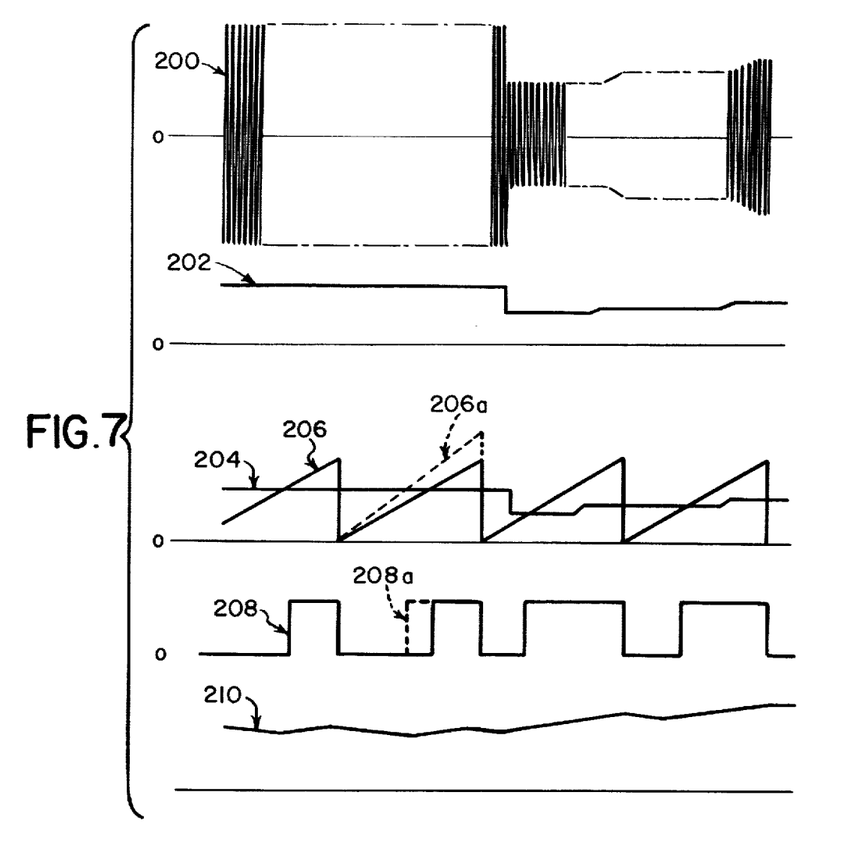
FIG. 7 illustrates electrical wave forms of various parts of FIG. 6.

High frequency signal waveform 200 in FIG. 7 illustrates the terminal voltage of condenser 80 of the series resonance circuit and the output of detection circuit 50 that has rectified this terminal voltage is shown as signal 202. Output signal 202 of detection circuit 50 is supplied via resistance 84 to an input terminal on one side of a differential amplifier 82 of current control circuit 44. An input terminal on the other side of amplifier 82 is supplied with a reference voltage from a reference voltage generator comprising reference power source 86 and a variable resistance 88. The detection signal 202 and the reference voltage are then compared in the amplifier. A control gain regulation apparatus comprising variable resistance 90 is installed between the input and output of differential amplifier 82, whereby a supply current control gain is furnished to heating coil 20 as desired by the current control circuit. Output 204 of amplifier 82 is supplied to a voltage pulse width transducer 92. The output of power source apparatus 42 is supplied to voltage pulse width transducer 92 and a triangular wave 206 having an incline corresponding to the output voltage of power source apparatus 42 is formed within transducer 92. Transducer 92, as will be apparent from the waveform drawing in FIG. 7, compares triangular wave 206 and output 204 of amplifier 82 and supplies an on signal to the base of transistor 60 only in the period when the voltage of triangular wave 206 exceeds the voltage of signal 204. Consequently, an output signal shown as pulse waveform 208 is supplied from the emitter of transistor 60 to smoothing circuit 46 and this smoothing output 210 is supplied to transistor oscillator circuit 48.

Voltage pulse width transducer 92 in FIG. 6 also has the function of compensating for the output voltage fluctuation of power source apparatus 42. That is, triangular wave 206 of transducer 92 has an incline corresponding to the power source voltage of power source apparatus 42, and when the power source voltage has declined, this incline becomes abrupt as shown by the broken line 206a in FIG. 7 with the result that the output pulse of current control circuit 44 has its pulse width increased, as shown by the broken line 208a, and because of this, there is an increase in the supply current supplied to transistor oscillator circuit 48. In this manner, following the example of FIG. 6, the power source voltage fluctuation of power source apparatus 42 can also be reliably compensated.

Following the induction heating circuit according to the present invention as shown above, it is possible to assure that constant heating energy is imparted to articles by the heating coil not withstanding frequency variations and load impedances varying in the heating coil because of change in numbers of articles or because of change in the electrical properties of the articles to be heated. This is accomplished by reliably detecting fluctuations in the high frequency current of heating coil 20 and using feedback control of the supply current supplied from power source apparatus 42 to oscillator circuit 48 which feedback control depends on the detection voltage of heating coil 20. The present invention is not characterized in that the current value of heating coil 20 is controlled to constancy. Rather it is characterized in that the current supplied to the heating coil 20 is varied by the number of caps supplied such that the energy imparted by the heating coil 20 to the articles is controlled to constancy, and as a result, the articles are heated at constantly uniform temperatures.

Ordinarily when a constant current is supplied to the heating coil 20, the heating temperature or heating energy of the articles to be heated should be maintained constant, but because of variations in the load impedance of heating coil 20, there will be variations in the resonance frequency of the heating coil circuit even if the supply current to the heating coil is kept constant. The result is that in actual practice it will be impossible to heat all articles at a uniform temperature. For example, in a case when different numbers of non-magnetic metal caps are supplied to the heating apparatus shown in FIG. 1 under conditions where a constant current flows in the heating coil, marked fluctuations will be seen in the heating temperature of each metal cap. Table 1 shows the heating temperature $\theta$ of the metal cap, the supply current IB and the output voltage VB of smoothing circuit 46 compared to the numbers of metal caps supplied when a feedback ratio is strongly applied by manipulating the control gain regulating apparatus 90 of current control circuit 44 in order to maintain the supply current to heating coil 20 constant which current is represented by the output terminal voltage Vc of condenser 80 in FIG. 4.

TABLE 1

| Cap Quantity (Number) | Vb (Volts) | IB (Amperes) | $\theta$ (°C.) |
|---|---|---|---|
| 1 | 95 | 30 | 80 |
| 9 | 160 | 32 | 100 |
| 18 | 200 | 33 | 130 |

(Vc: constant)

As will be apparent from Table 1, when condenser terminal voltage Vc is controlled to a constant value, the energy imparted to the caps, that is the temperature rise, decreases as the number of non-magnetic metal caps supplied decreases.

The present invention is characterized in that it removes the heating temperature fluctuations by flowing considerable current to the heating coil when the number of non-magnetic metal caps supplied to the heating apparatus is small, based on the properties of the induction heating apparatus described above.

The semiconductor oscillation circuit in the present invention has the characteristic that a high frequency signal is produced by means of a series resonance circuit between the heating coil and a condenser which increases the current in the series resonance circuit as the number of caps supplied decreases. As a result, in cases when there is no feedback system comprising current control circuit 44 in FIG. 6, and in case when no articles to be heated are supplied to the heating apparatus, there will be a markedly large flow of current to the heating coil. Because of this, it will be understood that current control circuit 44 in FIG. 6 performs a feedback action that suppresses the supply current as the number of caps supplied to heating coil 20 decreases. Consequently, the present invention has a feedback control characteristic such that greater amounts of current are supplied to heating coil 20 when the number of metal caps supplied to the heating apparatus decreases, this being done by means of a weaker feedback ratio without constant current control by current control circuit 44. This kind of feedback characteristic can be obtained by operating control gain regulation apparatus 90 in current control circuit 44 and lowering the amplification rate of differential amplifier 82.

Table 2 shows the supply voltage Vb to oscillator circuit 48, the supply current IB and the heating temperature $\theta$ related to the number of metal caps supplied in an induction heating circuit where a weak feedback control action relating to the present invention has been applied.

TABLE 2

| Cap Quantity (Number) | Vb (Volts) | IB (Amperes) | $\theta$ (°C.) |
|---|---|---|---|
| 1 | 132 | 35 | 130 |
| 9 | 175 | 34 | 130 |
| 18 | 200 | 33 | 130 |

As will be apparent from Table 2, a nearly constant heating temperature is obtained by performing a feedback control action that increases the current supplied to the heating coil, as the number of metal caps decreases.

In the above example, the interval between heating coil 20 and the bottom surface 16a of cap 16 was kept constant. When this interval is varied, there must be a corresponding adjustment in the above-described control characteristics.

Figure 8:
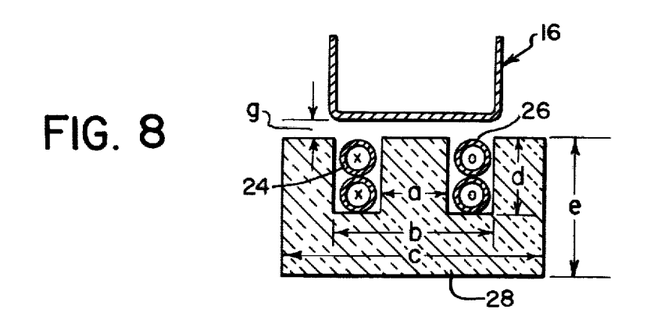
FIG. 8 is an enlarged sectional view illustrating position of metal caps with respect to a heating coil constructed according to the present invention.

The sectional shape of the heating coil, as shown in FIG. 8, is one where current conductors 24 and 26 comprise copper pipes 6 mm in diameter and are placed in a coil base plate 28. Plate 28 comprises a ferrite core with the following measurements a=12 mm, b=28 mm, c=40 mm, d=20 mm and e=27 mm, length=60 cm. The articles heated are aluminum caps and steel caps and the conditions discussed below are ones where the temperature gradient of the caps is constant regardless of the number of caps heated by the heating coil.

For the case when aluminum caps 28 mm in diameter, 15 mm high and 0.24 mm thick were heated, we find:

TABLE 3

|  | g = 1 mm | g = 2 mm |
|---|---|---|
| $k_1$ | 0.0069 | 0.0049 |
| $k_2$ | 0.071 | 0.052 |
| $k_3$ | 0.0025 | 0.0018 |
| $(k_2 - k_3)/(k_1 + k_3)$ | 7.29 | 6.69 |

For the case when aluminum caps 38 mm in diameter, 17 mm high and 0.24 mm thick were heated, we found:

TABLE 4

|  | g = 1 mm | g = 2 mm |
|---|---|---|
| $k_1$ | 0.0111 | 0.0083 |
| $k_2$ | 0.102 | 0.082 |
| $k_3$ | 0.0032 | 0.0024 |
| $(k_2 - k_3)/(k_1 + k_3)$ | 6.91 | 6.88 |

For the case when steel caps 28 mm in diameter, 9 mm high and 0.24 mm thick were heated:

TABLE 5

|  | g = 4 mm | g = 6 mm |
|---|---|---|
| $k_1'$ | 0.0021 | 0.0014 |
| $k_2'$ | 0.042 | 0.023 |
| $k_3'$ | 0.00076 | 0.00051 |
| $(k_2' + k_3')/(k_1' - k_3')$ | 31.9 | 26.4 | and for the case when steel caps 40 mm in diameter, 12 mm high and 0.24 mm thick were heated, we found:

TABLE 6

|  | g = 4 mm | g = 6 mm |
|---|---|---|
| $k_1'$ | 0.0039 | 0.0022 |
| $k_2'$ | 0.149 | 0.078 |
| $k_3'$ | 0.0013 | 0.00069 |
| $(k_2' + k_3')/(k_1' - k_3')$ | 57.8 | 52.1 |

The values $k_1$, $k_2$ and $k_3$ will vary depending on such factors as the interval between the cap bottom surface and the ferrite surface, the sectional shape of the heating coil, the cap diameter and the frequency of the high frequency power source, and consequently the value HG which depends on these factors will vary on the order of ±100%.

As described above, it is possible to obtain a nearly uniform heating energy, that is heating temperature, regardless of the number of articles supplied to the heating apparatus and regardless of the mutual inductance variations with the heating coil, by non-constant current control of the control characteristics of the current control circuit.

The control gain of the current control circuit can be done with any regulating apparatus besides the variable resistance in the example illustrated, and the current of the heating coil can also be detected by various other detection circuits.

Also following the present invention, it is possible to heat non-magnetic material such as aluminum at good efficiency and it is possible to provide extremely effective circuits for heating metal caps for sealing bottles in particular.

The present invention further makes it possible to obtain an increase in the current when a number of articles comprising a strong magnetic material supplied to the heating station decreases and to thus obtain a constant uniform heating action. This is accomplished by utilizing a feedback control action that is stronger than the constant current control in a current control circuit.

I claim:

1. In a high frequency induction heating circuit for heating a plurality of non-magnetic articles where said induction heating circuit includes a semiconductor oscillator circuit (48) having a series resonance circuit including a heating coil (20) along which said non-magnetic articles are adapted to be conveyed and a condenser (80), the improvement in that said induction heating circuit comprises:

detection circuit means (50) for detecting the teminal voltage of said condenser, said terminal voltage being increase responsive to the decrease of the number of said non-magnetic articles which are conveyed along said heating coil (20), current control circuit means (44) for controlling a supply current to said oscillator circuit (48) where the current control circuit means is responsive to a signal from said detecting circuit to increase the supply current to said oscillator circuit with an increase of said terminal voltage, and a control gain regulation means (90) for adjusting a control gain which is included in said current control circuit means (44) to adjust the ratio of the increase of said supply current to the increase of said terminal voltage so that the heating temperature of said non-magnetic article is kept substantially constant irrespective of the number of said non-magnetic articles which are conveyed along said heating coil.

2. In a high frequency induction heating ciruit for heating a plurality of ferromagnetic articles where said induction heating circuit includes a semiconductor oscillator circuit (48) having a series resonance circuit including a heating coil (20) along which said ferromagnetic articles are adapted to be conveyed, a condenser (80) and an inductance, the improvement wherein said induction heating circuit comprises:

detection circuit means (50) for detecting the terminal voltage of said inductance, said terminal voltage being decreased responsive to the decrease of the number of said ferromagnetic articles which are conveyed along said heating coil, current control circuit means (44) for controlling a supply current to said oscillator circuit (48) where the current control circuit means is responsive to a signal from said detecting circuit to decrease the supply current to said oscillator circuit with a decrease of said terminal voltage, and a control gain regulation means (90) for adjusting a control gain which is included in said current control circuit means to adjust the ratio of the decrease of said supply current to the decrease of said terminal voltage so that the heating temperature of said ferromagnetic article is kept substantially constant irrespective of the number of said ferromagnetic articles which are conveyed along said heating coil.

* * * * *